United States Patent [19]
Moris et al.

[11] 4,268,877
[45] May 19, 1981

[54] RECORDING AND/OR PLAYBACK MACHINE WHICH AFFORDS USE OF VARIOUS SIZED MAGAZINES

[75] Inventors: Alfred H. Moris; Steven S. Wysocki, both of St. Paul, Minn.

[73] Assignee: Minnesota Mining and Manufacturing Company, St. Paul, Minn.

[21] Appl. No.: 23,302

[22] Filed: Mar. 23, 1979

[51] Int. Cl.³ .................... G11B 23/06; G11B 15/70
[52] U.S. Cl. .................... 360/94; 242/55.19 A; 360/132
[58] Field of Search .................... 360/93–94, 360/132, 134, 137, 96; 242/197, 198, 55.19 A, 55.19 R

[56] References Cited

U.S. PATENT DOCUMENTS

| | | | |
|---|---|---|---|
| 2,852,254 | 9/1958 | Reiskind | 242/55.19 R |
| 3,350,025 | 10/1967 | Lear | 242/55.19 R |
| 3,594,008 | 7/1971 | Takagi et al. | 360/94 |
| 3,661,336 | 5/1972 | Lace | 242/55.19 A |
| 4,008,490 | 2/1977 | Lemelson | 360/94 |
| 4,054,925 | 10/1977 | Towner et al. | 242/55.19 R |

FOREIGN PATENT DOCUMENTS 2001931  2/1979  United Kingdom ........ 242/55.19 A

*Primary Examiner*—Alfred H. Eddleman
*Attorney, Agent, or Firm*—Cruzan Alexander; Donald M. Sell; William L. Huebsch

[57] ABSTRACT

A magazine adapted to be received at a station having spaced side guide members for receiving a portion of the magazine therebetween. The magazine comprises a hub portion; an endless length of tape having a portion wound in a coil about the hub portion and a minor portion extending from the innermost wrap of the coil along a path around the side surface of the coil to the outermost wrap of the coil; and a case including a first case portion enclosing the path for the strip material around the side surface of the coil which is adapted to be received between the guide members, and a second case portion enclosing the coil which can be wider than the first case portion to provide clearance space for a coil wider than the first case portion.

6 Claims, 10 Drawing Figures

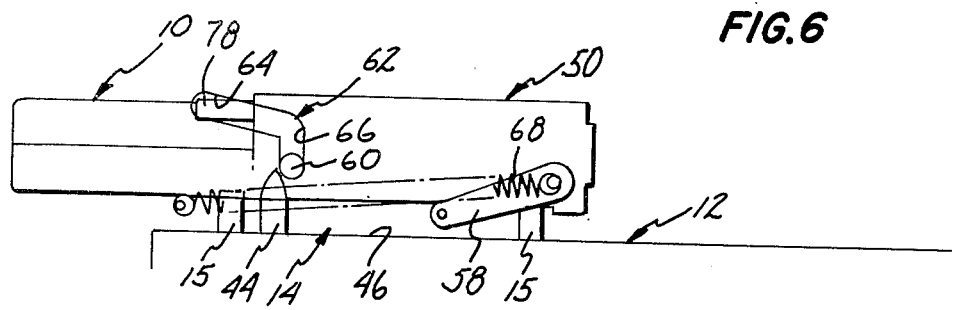
FIG.6
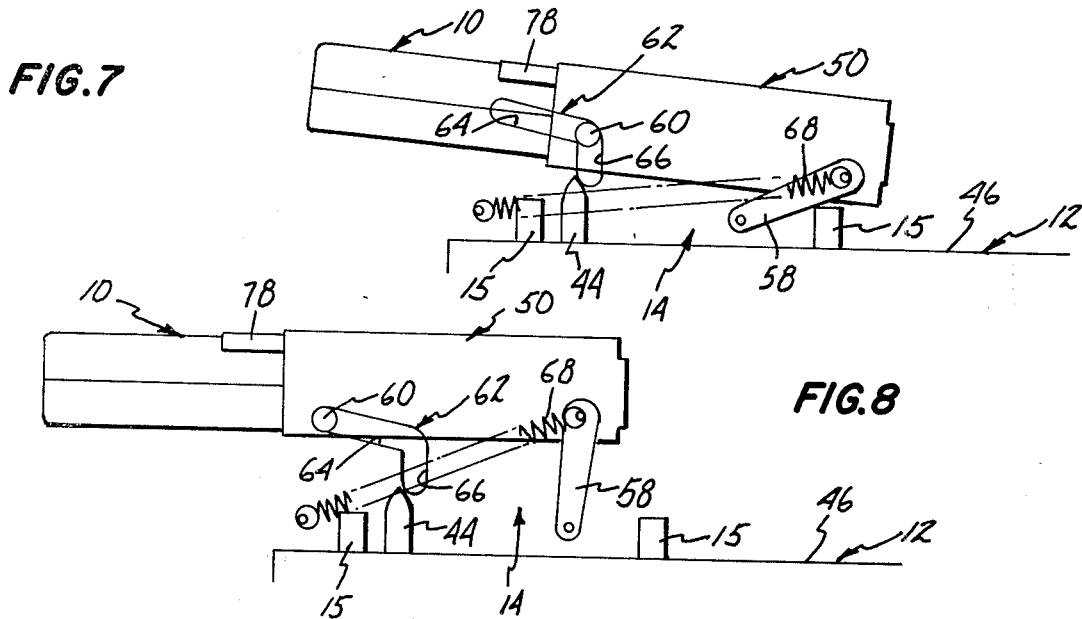
FIG.7
FIG.8
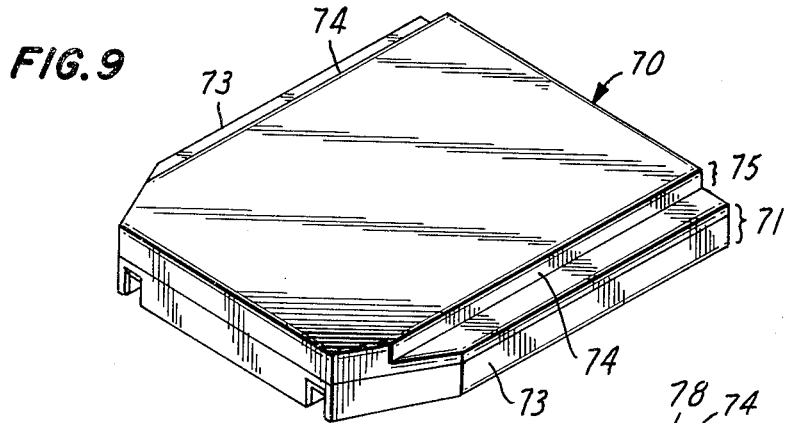
FIG.9
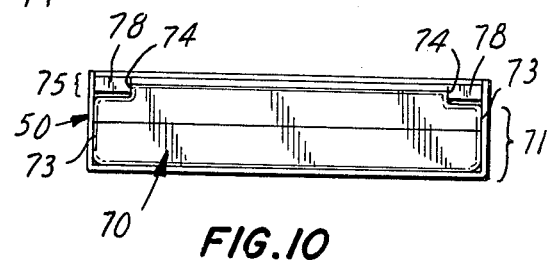
FIG.10

RECORDING AND/OR PLAYBACK MACHINE WHICH AFFORDS USE OF VARIOUS SIZED MAGAZINES

BACKGROUND OF THE INVENTION

The present invention relates to magazines including an endless length of strip material, machines including a magazine receiving station at which is positioned a transducer for recording and/or for reading signals on the strip material in the magazine, and means provided by the combination of the magazine and machine for releasably positioning the magazine at the station.

Heretofore the design of known machines for recording and/or recording signals on strip material or magnetic recording tape in magazines and the design of the magazines adapted to be received in the machines have not afforded easy interchangeable use of magazines of different sizes and strip material capacities in the machines.

Typically the magazines for use in such machines comprise a generally cylindrical hub portion, an endless length of strip material having a major portion wound in a coil about the hub portion and a minor portion extending from the innermost wrap of the coil along a path around the side surface of the coil to the outermost wrap of the coil, and a case enclosing both the coil and the path for the strip material around the side surface of the coil.

Also typically the machine adapted to receive the magazine has means defining a station and means for releasably positioning the magazine in a predetermined position at the station comprising spaced side guide members adapted for engaging the side walls of the magazine when it is positioned at the station.

One such magazine is that described in U.S. Pat. No. 3,350,025. Magazines generally of that type have been produced in different widths to afford different tape capacities, and machines have been designed that could accept the different width cartridges. Such acceptance, however, has required adjustments of the members adapted for engaging the side walls of the magazine to ensure that the transducers and means for pulling the strip material through the magazine will properly engage the strip material in the magazine. Thus the interchange of magazines is not as convenient as may be desired and is not commonly practiced, particularly in the broadcast industry where such adjustments interfere with the operator's other duties.

SUMMARY OF THE INVENTION

The present invention provides an improved design for a magazine and a machine of the type described above which design includes locating means for magazines releasably positioned at a magazine receiving station on the machine that affords easy interchangeable use of magazines of different sizes and strip material capacities in the machine without the need for adjustments.

According to the present invention there is provided a magazine comprising a generally cylindrical hub portion, an endless length of strip material having a major portion wound in a coil about the hub portion and a minor portion extending from the innermost wrap of the coil along a path around the side surface of the coil to the outermost wrap of the coil, and a case. The case includes a first portion enclosing the path for the strip material around the side surface of the coil and comprising opposite first side wall portions positioned on opposite sides of the path for the strip material around the side surface of the coil. The first side wall portions of the case are spaced at a predetermined distance which can be less than the diameter dimension of the coil, and have outer surfaces adapted to engage and be positioned by side guide members at a station on the machine to provide lateral positioning of the magazine relative to the station. The case also includes a second portion enclosing the coil and hub portion and comprising opposite side wall portions generally parallel with the first side wall portions and positioned on opposite sides of the hub and coil. The second side wall portions are not engaged by the side guide members on the machine and thus can be spaced farther apart than the side walls of said first portion and at different distances to afford clearance space for tape coils of different capacities, while still allowing magazines with differently spaced second side wall portions to be engaged with the machine without adjustment of the machine.

In a preferred embodiment of the invention adapted from a magazine and machine described in U.S. Pat. application No. 820,250, filed July 29, 1977 (the disclosure whereof is incorporated herein by reference), now abandoned, the means for defining a station comprises a transducer, means for edge guiding the strip material past the transducer, and means for pulling the strip material past the edge guide means and transducer; the hub has a central opening and a slot extending axially across its full width and communicating with the central opening; the minor portion of the strip material extends through the slot and partially across the central opening and then along the path around the side surface of the coil; and the means for releasably receiving and positioning includes means for affording relative movement between the magazine and the means for defining a station between a disengaged position with the magazine spaced from the transducer, means for guiding and means for pulling; and an engaged position with the transducer, means for guiding and means for pulling positioned in the central opening of the hub portion. Also the means for affording relative movement comprises a movable frame portion having walls providing the guide members and defining a socket having an inlet opening adapted to slidably receive the magazine with the first side wall portion of the magazine along the side guide members, and means for mounting the moveable frame portion on the means for defining a station for movement between the disengaged position and the engaged position.

BRIEF DESCRIPTION OF THE DRAWING

The invention will be further described with reference to the accompanying drawing wherein like numbers refer to like parts in the several views, and wherein:

FIGS. 6, 7 and 8 schematically and progressively illustrate the engaged position, an intermediate position, and the disengaged position of the movable frame portion with the magazine positioned therein;

FIG. 9 illustrates an alternate larger capacity embodiment of tape magazine of FIG. 1 which with the magazine shown in FIGS. 1 through 8 is adapted to be interchangeably received by the machine; and FIG. 10 is a fragmentary end view of the movable frame portion of FIG. 1 with the magazine of FIG. 9 positioned therein.

DESCRIPTION OF THE PREFERRED EMBODIMENT

Figure 1:
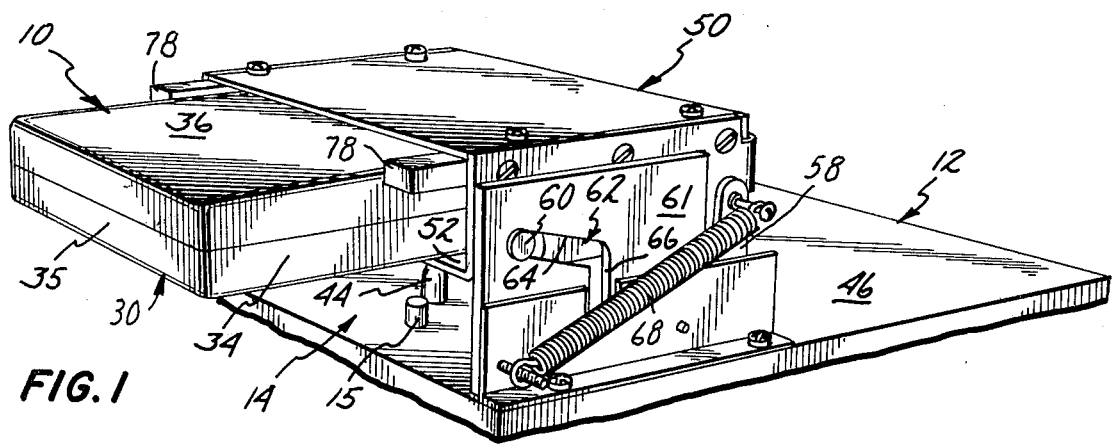
FIG. 1 is a fragmentary perspective view of a tape magazine and recording and/or playback machine according to the present invention shown with the magazine received in a movable frame portion of the machine, which moveable frame portion is shown positioned at a disengaged position with the magazine spaced from a magazine receiving station on the machine.
Figure 2:
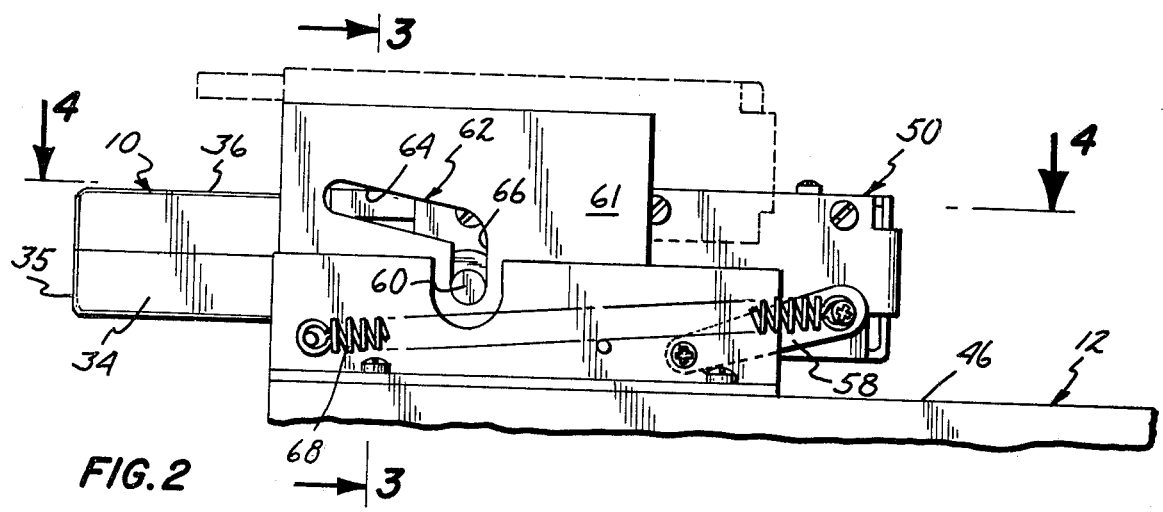
FIG. 2 is a side view of the machine and magazine of FIG. 1 but shown with the movable frame portion and the magazine moved from its disengaged position (shown in dotted outline) to an engage position with the magazine positioned at the station.

Referring now to the drawing, there is shown in the combination according to the present invention comprising a cartridge or magazine (i.e., either the magazine 10 containing an endless length of strip material or magnetic recording tape 11 shown in FIGS. 1 through 8, or, the magazine 70 which also contains an endless length of tape shown in FIGS. 9 and 10), and a machine 12 adapted to releasably and interchangeably receive either the magazine 10 or the magazine 70 at a station 14 to record and/or play signals recorded on the tape.

Figure 3:
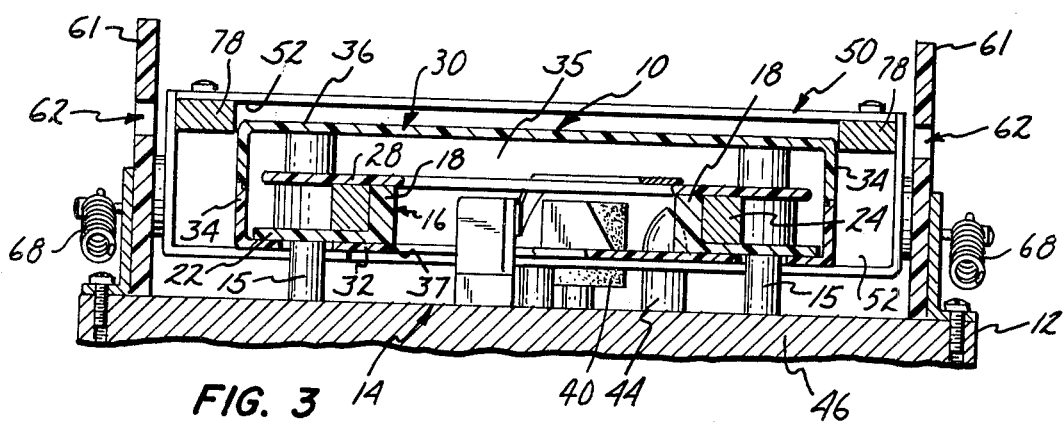
FIG. 3 is an enlarged sectional view taken approximately along lines 3—3 of FIG. 2.
Figure 4:
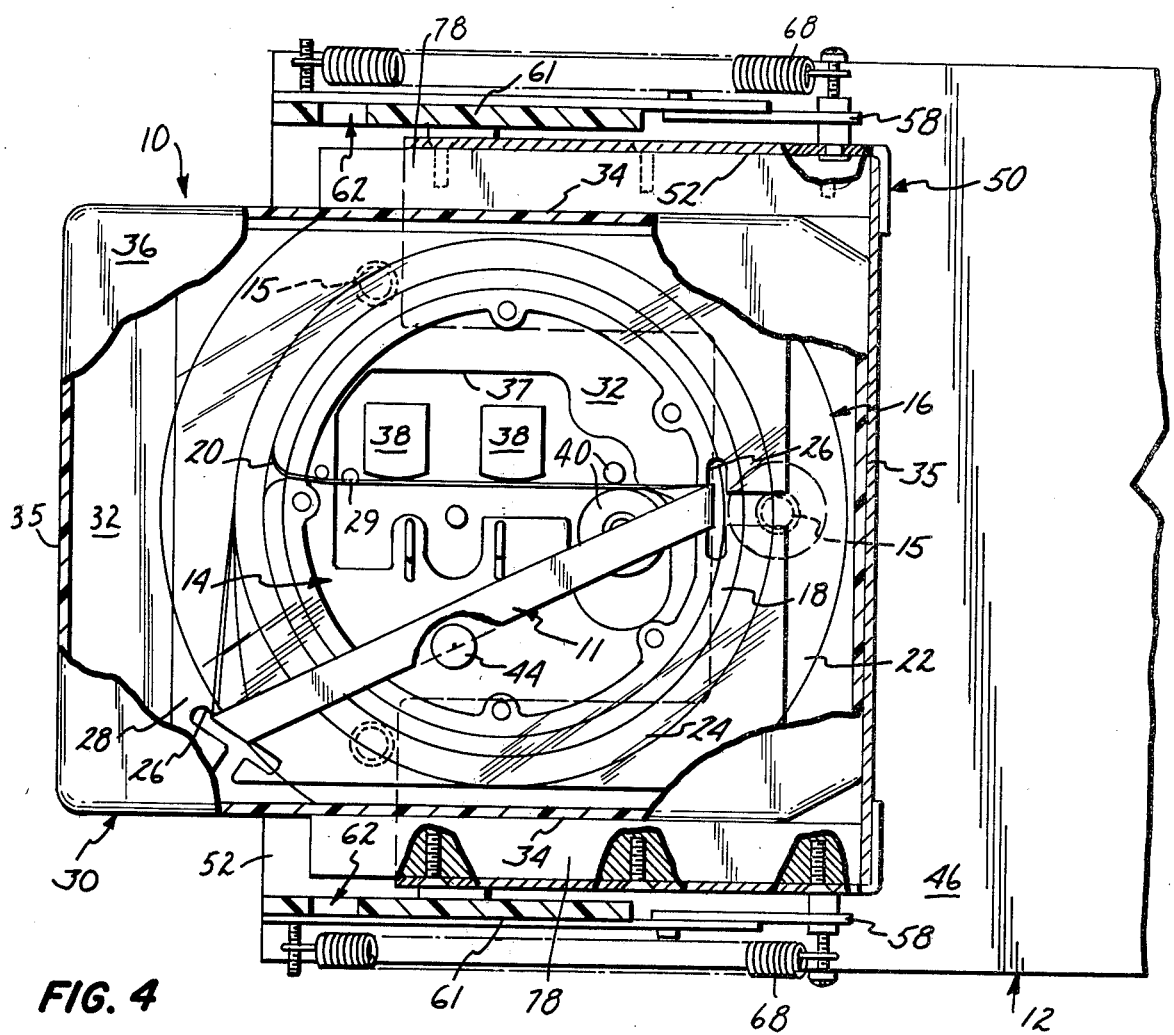
FIG. 4 is an enlarged sectional view taken approximately along lines 4—4 of FIG. 2 and having parts of the magazine broken away to show details.
Figure 5:
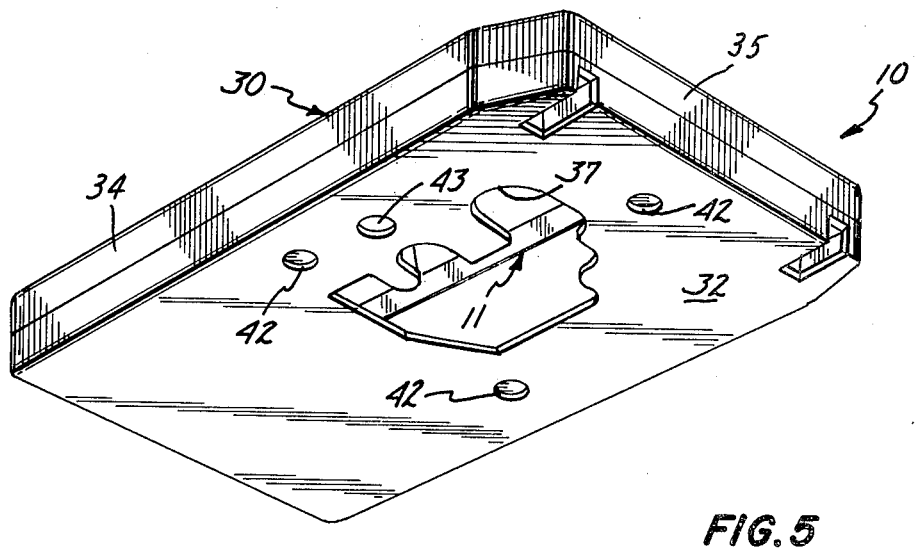
FIG. 5 is a perspective bottom view of the magazine of FIG. 1.

The magazine 10, best seen in FIGS. 3 through 5, includes an integral tape support member 16 of a low friction polymeric material (e.g., "Teflon"), comprising a generally cylindrical hub portion or hub 18 having a central opening and having a slot 20 extending axially across its full width and communicating with the central opening, and a flange portion or flange 22 extending radially outwardly from one edge of the hub portion 18.

The endless length of tape 11 has a major portion wound in a coil 24 about the hub portion 18 adjacent the flange portion 22 and has a minor portion extending from the innermost wrap of the coil 24 through the slot 20, partially across the central opening in the hub portion 18 and around the side surface of the coil 24 to the outermost wrap of the coil 24. From the central opening in the hub portion 18 the tape 11 is guided to the coil 24 via guide slots 26 in a transparent polymeric plate 28 which is fastened to the end of the hub portion 18 opposite the flange portion 22. In addition to the guide slots 26, the plate 28 provides a flange opposing the flange portion 22 to help maintain the coil 24 on the hub portion 18. The hub portion 18 has a width between the plate 28 and flange portion 22 at least 0.025 inch greater than the width of the strip material 11 to allow shifting of the coil 24 axially along the hub portion 18 for alignment of the edges of the coil 24 with a tape edge guide 29 on the machine 12 for guiding the strip material past transducers 38 on the machine 10 in the central opening of the hub portion 18 when the magazine 10 is in the station 14 so that there will be low transverse tension in the strip material 11 being pulled into the central opening in the hub portion 18 through the slot 20; and the hub portion 18 includes a plurality of annular ribs (not shown) spaced axially of the hub portion 18, which ribs extend around the hub portion 18 and define the surface of the hub portion adjacent the innermost wrap of the coil 24 to reduce friction both between the coil 24 and the hub portion and between adjacent wraps of the coil 24 to provide a significant reduction of tension in tape being pulled into the central opening in the hub portion 18, all as is explained in greater detail in U.S. patent application No. 820,250 filed July 29, 1977, the content whereof is incorporated herein by reference.

Also the magazine 10 comprises a two-part case 30 having generally rectangularly disposed wall portions including a base wall portion 32, side wall portions 34 and end wall portions 35 (half of each of which side and end wall portions 34 and 35 is provided by each part of the case 30), and a top wall portion 36. The base wall portion 32 overlays the side of the flange portion 22 opposite the hub portion 18 and has numerous openings including a generally centered opening 37 adapted to receive the transducers 38, the tape edge guides 29 and tape drive rollers 40 at the station; three openings 42 in predetermined equal spaced relationship around the flange portion 22 of the tape support member 16 adapted to receive the end portions of the three support pins 15 at the station 14 to provide a means for precisely locating the hub portion 18 of the magazine 10 with respect to the transducer 38 and guides on the machine 12 (as will later be more thoroughly explained); and an opening 43 communicating with the central opening in the hub portion 18 adapted to receive the tapered end of a locating pin 44 at the station 14 which provides a portion of means for moving the magazine 10 into and out of engagement with the means for locating (which also will later be more thoroughly described).

Except for the portion of the machine 12 that provides the means for locating the magazine 10 or 70 at the magazine receiving station 14 and the means for moving the magazine 10 or 70 into and out of engagement with the means for locating from the front of the machine 12, the machine 12 has generally the same structure as the machine described in U.S. patent application No. 820,250 (incorporated herein by reference), now abandoned. Thus only the portion of the machine 12 that provides these means for locating and means for moving will be described in detail herein.

The means for locating the magazine 10 or 70 at the station includes a top plate 46 of a frame for the machine from which the three support pins 15 project upwardly. The distal surfaces of the support pins 15 are aligned in one plane, which plane has a precise location relative to the transducers 38 and the tape edge guides 29 at the station 14 such that with the surface opposite the hub portion 18 of the flange portion 22 in the magazine 10 or 70 resting on the ends of the support pins 15, the hub portion 18 around which the coil 24 of tape is wound will be properly centered around the tape edge guides 29 and the transducers 38. Maintenance of the same alignment between different magazines 10 or 70 will be dependent only on providing flange portions 22 with the same thickness dimension at the openings 42, which dimensions can easily be checked and adjusted during production, if necessary, and will not be affected by irregularities in the case 30 caused during or after production.

Alternatively, openings might be found in the flange portion 22 (e.g. during molding of the tape support member 16) so that the ends of the support pins 15 could bear directly against an edge surface of the hub portion 18 to provide accurate positioning of the hub portion 18.

The means for moving the magazine 10 or 70 into and out of engagement with the support pins 15 included in the means for locating the magazine 10 or 70 at the station 14 comprises a movable frame portion 50 having walls defining a socket 52 adapted to receive either the magazine 10 or the magazine 70 edgewise of its base wall portion 32 in a predetermined orientation; means mounting the movable frame portion 50 on the top plate 46 of the machine frame for relative movement between a disengaged position with the base wall portion 32 of the magazine 10 or 70 spaced from the support pins 15, the transducers 38, the tape edge guide 29 and the drive rollers 40 when the magazine 10 or 70 is positioned in the socket 52 (FIG. 1), and an engage position (FIGS. 2 and 3) with the end portions of the support pins 15 positioned within the openings 42 in the base wall portion 32 of the magazine 10 or 70 to support the tape support member in the magazine 10 or 70, and with the transducers 38, the tape edge guide 29 and the drive rollers 40 projecting through the opening 37 into the central opening in the hub portion 18; and means for aligning the magazine 10 to afford engagement of the support pins 15 in the openings 42 as the frame portion 50 moves from its disengaged toward its engage position, which means for aligning is provided both by the walls defining the socket 52 and the locating pin 44 which has a tapered end portion projecting above the support pins 15 to engage the opening 43 in the base wall portion 32 and properly position the magazine 10 or 70 in the socket 52 for engagement by the support pins 15 just before the movable frame portion 50 reaches its engage position. After the tapered pin 44 engages with the opening 43 it will also provide means for locking the magazine 10 or 70 in the frame portion 50 while the magazine 10 or 70 is at the station 14.

The means mounting the movable frame portion 50 for movement between its disengaged and engaged position comprises parallel arms 58 each having one end pivotably mounted on the top plate 46 of the frame and another end pivotably mounted on a different one of the side walls of the movable frame portion 50 at the end of the side wall opposite the opening to the socket 52 to afford movement of a rear part of the movable frame portion 50 from a first position spaced a first distance from the top plate 46 to a second position more closely adjacent the top plate 46; opposite trunnions 60 projecting outwardly from the side walls of the movable frame portion adjacent the opening; and cam plates 61 fixed to the top plate on opposite sides of the movable frame portion 50 and each having edge surfaces defining a slot 62 receiving a different one of the trunnions 60 and guiding that trunnion 60. Each slot 62 has a generally horizontal portion 64 guiding the trunnion 60 therein to afford movement of a front part of the moveable frame portion 50 first along a generally horizontal path toward the rear of the machine 12 upon movement of the rear part of the movable frame portion 50 from its first to its second position, and a generally vertical slot portion 66 extending from the generally horizontal portion 64 of the slot toward the top plate 28 to afford movement of the front part of the moveable frame portion 50 toward the top plate 46 by pivoting the movable frame portion 50 about its juncture with the arms 58 to position the magazine 10 or 70 on the support pins 15 at the station 14 after the rear part of the moveable frame 50 is in its second position.

Also the means for mounting the movable frame portion 50 includes parallel springs 68 tensioned between the cam plates 61 and the movable frame portion 50 which are oriented to provide means for biasing the rear part of the movable frame portion 50 to its first position when the trunnion 60 are along the generally horizontal portions 64 of the slots 62 to help return the movable frame portion 50 to its disengaged position when a magazine 10 or 70 is being removed, but which will not apply a force component that will move the trunnion 60 out of the generally vertical portions 66 of the slots 62 when the frame position 50 is in its engaged position.

The magazine 70 illustrated in FIG. 9 has the same structure as the cassette 10 except that a second lower portion 71 of a case 72 for the cassette which encloses the coil of strip material around the hub portion for the cassette 70 comprises second side wall portions 73 that are spaced further apart than parallel first side wall portions 74 of a first portion 75 of the case 72 enclosing means defining the path for the strip material around the side surface of the coil (which is provided by a slotted plate like the slotted plate 28 in the magazine 10) to provide clearance so that a larger coil of strip material may be wound on the hub portion in the cassette 70 than on the hub portion 18 in the cassette 10.

Transverse guiding for the cassette 70 in the movable frame portion, like that for the cassette 10, is provided by elongate side guide members 78 defining the socket in the moveable frame portion 50, which side guide members 78 only bear against the first side wall portions 74 on the first portion 75 of the case 72. The openings in the base wall of the magazine 70 and its hub portion are transversely related to the first side wall portion 74 so that cases having various spaces between the second side wall portion 73 may be interchangeably received in the socket in the moveable frame member 50 without adjustment of the machine 12.

We claim:

1. A magazine adapted to be received at a station having spaced side guide members for receiving a portion of the magazine therebetween, said magazine comprising:

a generally cylindrical hub portion;

an endless length of strip material having a major portion wound in a coil about the hub portion and a minor portion extending from the innermost wrap of the coil along a path around the side surface of the coil to the outermost wrap of the coil; and a case including a first case portion enclosing said path for the strip material around the side surface of the coil and comprising opposite first side wall portions positioned on opposite sides of said path for the strip material around the side surface of the coil, said first side wall portions being spaced at a predetermined distance and having outer surfaces adapted to engage and be positioned by the side guide members at a said station to provide lateral positioning of said magazine relative to said station; and a second case portion enclosing said coil and hub and comprising opposite second side wall portions generally parallel with said first side wall portions on opposite sides of said hub and coil and spaced farther apart than said first side wall portions to afford clearance space for said coil.

2. In combination:

a magazine comprising:

a generally cylindrical hub portion;

an endless length of strip material having a major portion wound in a coil about the hub portion and a minor portion extending from the innermost wrap of the coil along a path around the side surface of the coil to the outermost wrap of the coil; and a case including a first case portion enclosing said path for the strip material around the side surface of the coil and comprising opposite first side wall portions positioned on opposite sides of said path for the strip material around the side surface of the coil, said first side wall portions being spaced at a predetermined distance and having outer surfaces; and a second case portion enclosing said coil and hub and comprising second opposite side wall portions generally parallel with said first side wall portions on opposite sides of said hub and coil; and a recording and/or playback machine comprising:
means defining a station for releasably receiving and positioning said magazine in a predetermined position on said machine comprising spaced side guide members adapted for only receiving said first side wall portion of said case therebetween in close-fitting relationship to provide lateral positioning of said magazine relative to said station.

3. A combination according to claim 2 wherein said means for defining a station comprises a transducer means for guiding said strip material past the transducer and means for pulling said strip material past said means for guiding and said transducer; said hub has a central opening and a slot extending axially across its full width and communicating with said central opening; said minor portion of said strip material extends through said slot and partially across said central opening and then along said path around the side surface of the coil; and said means for releasably receiving and positioning includes means for affording relative movement between said magazine and said means for defining a station between a disengaged position with said magazine spaced from said transducer said means for guiding and said means for pulling, and an engaged position with said transducer said means for guiding and said means for pulling in said central opening.

4. A combination according to claim 3 wherein said means for affording relative movement comprises a movable frame portion having walls providing said guide members and defining a socket having an inlet opening adapted to slidably receive said magazine with the side walls of said first portion along said guide members, and means for mounting said frame portion on said means for defining a station for movement between said disengaged position and said engaged position.

5. A combination according to claim 4 wherein said means for defining a station comprises a top plate, said transducer said means for guiding and said means for pulling project upwardly from said top plate, said movable frame portion has side walls including said guide members and an end wall between said side walls opposite said inlet opening, and said means mounting said movable frame portion for movement comprises parallel arms each having one end pivotably mounted on said top plate and another end pivotably mounted on a different one of said side walls at its end opposite said opening to afford movement of a rear part of said movable frame portion adjacent said end wall from a first position spaced from said station to a second position more closely adjacent said station, opposite trunnions projecting outwardly from opposite sides of said movable frame portion and cam plates fixed to said top plate on opposite sides of said movable frame portion and each having edge surfaces defining a slot receiving and guiding a different one of said trunnions, said slots each having a generally horizontal portion guiding said trunnions upon movement of said part of the movable frame portion from its first to its second position, and a portion extending from said generally horizontal portion toward said top plate to afford movement of a front part of said movable frame portion adjacent said opening toward said top plate by pivoting said movable frame portion about said arms to position the magazine at said station when the magazine is in said socket.

6. A combination according to claim 2 wherein said first side wall portions are spaced farther apart than said first wall portions to afford clearance space for said coil.

* * * * *